April 8, 1969  D. C. KEATHLY  3,437,376
TAILGATE LATCH
Filed March 17, 1967  Sheet 2 of 2
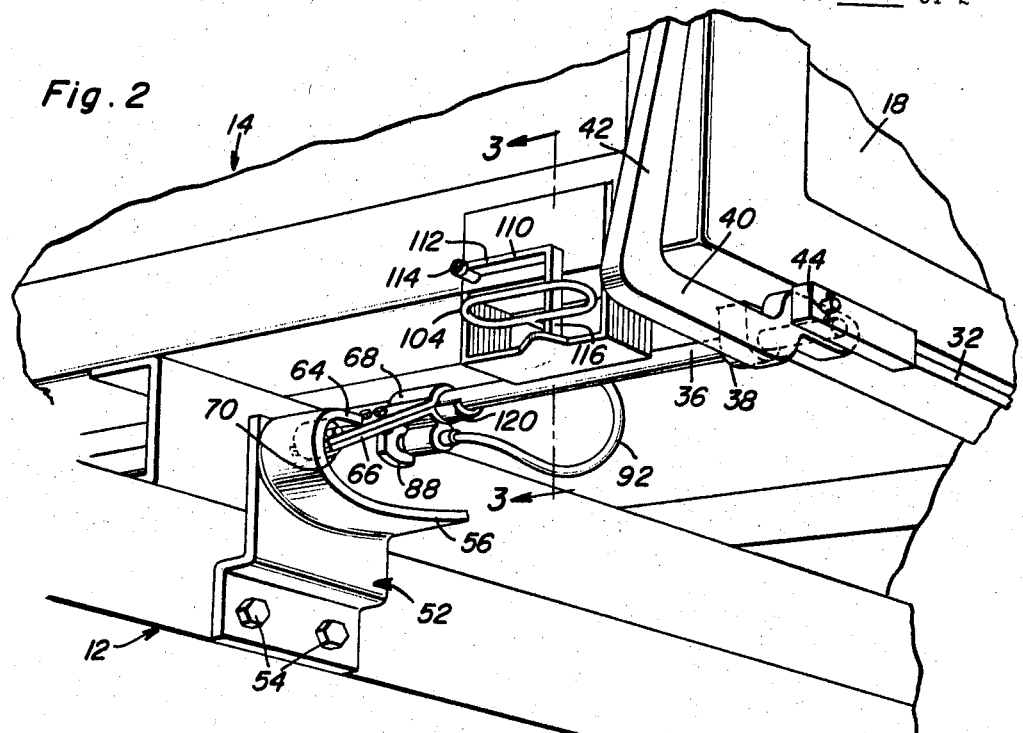
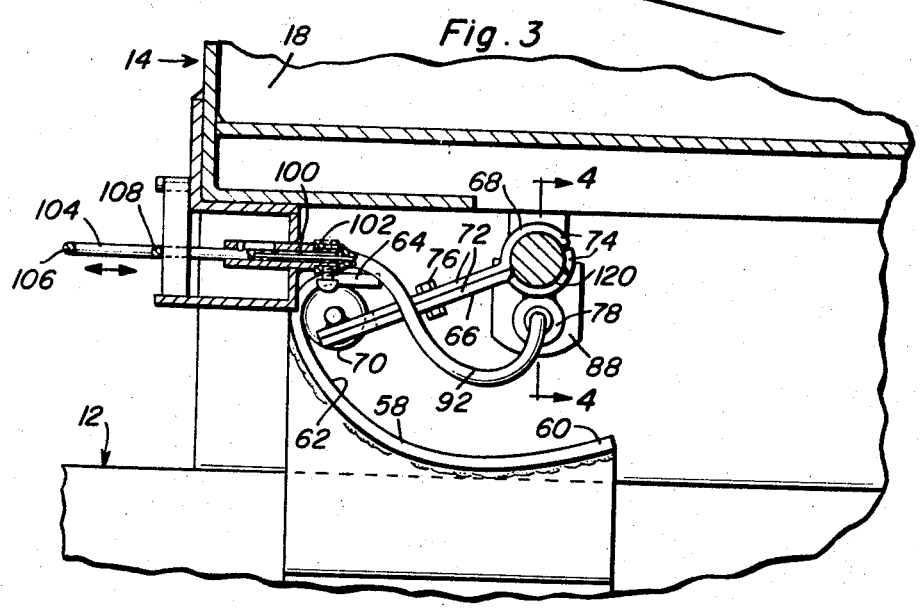
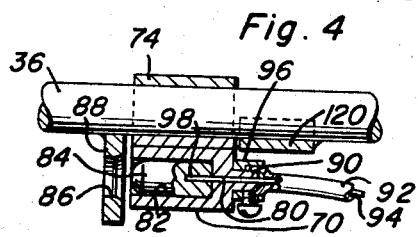
Donald C. Keathly
INVENTOR.
BY
*Attorneys*

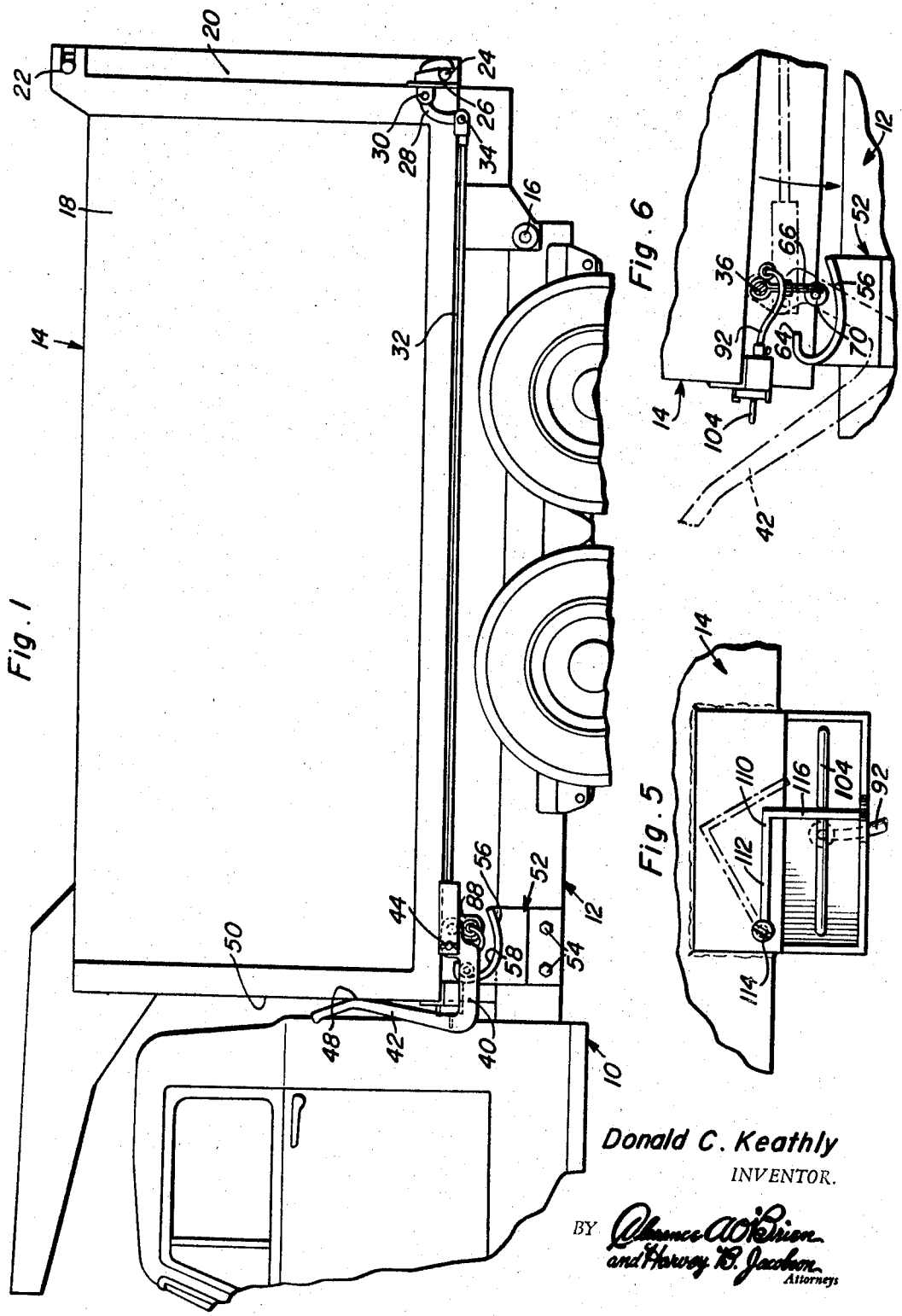

United States Patent Office 3,437,376
Patented Apr. 8, 1969

3,437,376
TAILGATE LATCH
Donald C. Keathly, 3141 S. 3rd St.,
Louisville, Ky. 40214
Filed Mar. 17, 1967, Ser. No. 623,860
Int. Cl. B60p 1/28
U.S. Cl. 298—23       4 Claims

ABSTRACT OF THE DISCLOSURE

A tailgate latching mechanism for use on trucks including dump bodies and a tailgate movable between first and second positions in and out of position closing the rear end of the dump body with the latching mechanism including (1) the usual manually actuatable portion for locking and unlocking the tailgate, (2) a deactivatable automatic actuator means to automatically actuate the tailgate latching mechanism in response to movement of the load bed to its horizontally disposed position from a dumping position and to automatically deactivate the latching mechanism in response to movement of the load bed from the horizontally disposed position, and (3) control means operatively connected between the load bed and the automatic actuator means operative to selectively deactivate the automatic actuator means.

The main object of this invention is to provide a gate latching mechanism for the tailgate of a dump truck and which will include all of the usual manually actuatable portions of the tailgate latching mechanism for unlatching and latching the associated tailgate and which will also include automatic actuator means, responsive to movement of the load bed to and from its horizontally disposed position for automatically latching and unlatching the tailgate but including control means operatively connected between the load bed and the automatic actuator means selectively operable to deactivate the automatic actuator means. By this type of construction the tailgate latching mechanism of the instant invention may be selectively operated either automatically or manually as desired by the operator of the associated dump truck.

Another object of this invention is to provide a gate latching mechanism in accordance with the immediately preceding object and which may be readily constructed by only slightly modifying an adding to conventional dump truck tailgate latching mechanisms.

Still another object of this invention, in accordance with the immediately preceding object, is to provide a gate latching mechanism which may be readily constructed by modifying existing conventional tailgate latching mechanisms.

A final object of this invention to be specifically enumerated herein is to provide a tailgate latching mechanism which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a conventional form of dump truck upon which the gate latching mechanism of the instant invention is mounted;

FIGURE 2 is an enlarged fragmentary perspective view of the forward corner of the dumping load bed of the dump truck with which the gate latching mechanism of the instant invention is operatively associated illustrating the tailgate latching mechanism in the active position;

FIGURE 3 is an enlarged fragmentary vertical sectional view taken substantially upon the plane indicated by the section line 3—3 of FIGURE 2;

FIGURE 4 is a fragmentary vertical sectional view taken substantially upon the plane indicated by the section line 4—4 of FIGURE 3;

FIGURE 5 is a fragmentary front elevational view of the control means for rendering the automatically operating portion of the latching mechanism operable or inoperable; and FIGURE 6 is a fragmentary side elevational view of the forward portion of the dump-type load body or bed of the truck in position descending toward its final horizontally disposed position for actuation of the automatic portion of the gate latching mechanism.

Referring now more specifically to the drawings the numeral 10 generally designate a conventional form of dump truck including a frame referred to in general by the reference numeral 12 from which a dump-type load bed referred to in general by the reference numeral 14 is pivotally supported as at 16 for swinging movement about a horizontal axis extending transversely of the frame 12 between the horizontally disposed position illustrated in FIGURE 1 of the drawings and an inclined dumping position with the forward end of the load bed 14 elevated relative to the frame 12.

The load bed 14 includes opposite side walls 18 from whose rear upper corners an end or tailgate 20 is pivotally supported as at 22 for swinging movement of the tailgate between the closed position illustrated in FIGURE 1 of the drawings and an open position with the lower end of the tailgate 20 swung rearwardly away from the rear ends of the side walls 18, the lower portions of the opposite side marginal edges of the tailgate 20 including outwardly projecting pins 24 engageable against abutment stops 26 carried by the side walls 18 and lockable in position against the stops 26 by means of a pair of levers 28 pivotally supported from the side walls 18 as at 30.

One pair of corresponding ends of the levers 28 are engageable with the pins 24 for urging the latter toward seated positions against the abutment stops 26 and the other pair of corresponding ends of the levers 28 have the rear ends of a pair of elongated and horizontally disposed operating rods 32 pivotally secured thereto as at 34.

A horizontally disposed and transversely extending operating shaft 36 extends beneath and is journaled from the forward end of the load bed 14 in any convenient manner such as by journal blocks 38. The right hand end portion of the shaft 36 illustrated in FIGURE 2 has a manually actuatable operating lever 40 secured thereto whereby the shaft 36 may be angularly displaced upon angular displacement of the lever 40 about the center axis of the shaft 36 and the other end of the operating shaft 36 has a similar lever (not shown) secured thereto. The lever 40, however, includes an extended handle portion 42 which may or may not be provided on the other lever. The forward ends of the operating rods 32 are pivotally secured to the corresponding levers as at 44 and it may be seen from FIGURE 1 of the drawings that when the lever 40 is in the position illustrated in FIGURE 1 and the levers 28 are in position locking the tailgate 20 in its closed position the center of the pivot connection between the operating rod 32 illustrated in FIGURE 1 and the lever 40 is disposed in a horizontal plane spaced at least slightly above the longitudinal center axis of the operating shaft 36. It will also be noted that the handle portion 42 includes on abutment portion 48 abutted against the front face 50 of the load bed 14 thereby preventing further rearward movement of the upper end of the handle portion 42. Of course, the over-center positioning of the pivot connection between the operating rod 32 and the lever 40 ensures that a rearward force applied to the tailgate 20 by a load disposed in the load bed 14 will not be operative to release the gate latching mechanism.

The above preceding description of the latching mechanism for latching the tailgate 20 in the closed position may be considered as at least substantially conventional.

The instant invention includes the provision of a bracket referred to in general by the reference numeral 52 suitably mounted on the frame 12 by means of fasteners 54 and including a curved laterally outwardly projecting camming flange 56. The flange 56 includes an upper surface 58 whose rear end 60 is rearwardly and upwardly inclined and whose forward end 62 is forwardly and upwardly inclined. Further, the forward end of the flange 56 terminates in a back-turned portion 64.

A camming lever arm 66 includes one sleeve-defining end portion 68 through which the operating shaft 36 extends and is journaled. The camming lever arm 66 projects generally radially outwardly of the shaft 36 and has rotatably journaled on the free end thereof a roller 70, the lever arm 66 comprising a pair of superposed plates 72 including generally semi-cylindrical end portions 74 which together form the sleeve-defining end portion 68 when the plates 72 are secured together by means of suitable fasteners 76.

A sleeve portion 78 is carried by one of the semicylindrical end portions 74 and has a bore 80 formed therethrough including a diametrically enlarged counterbore 82 at one end in which a locking pin 84 is snugly received and from which the end of the locking pin 84 remote from the bore 80 may be extended for reception in a bore 86 extending through a stop flange 88 carried by and projecting generally radially outwardly of the shaft 36. The end of the sleeve portion 78 remote from the counterbore 82 includes a diametrically reduced neck 90 through which the bore 80 extends and the outer casing 92 of a Bowden cable including a center core 94 shiftable longitudinally through the casing 92 is secured over the neck or neck portion 90 by means of a suitable clamp 96. The core or core member 94 has one end 98 anchored to the locking pin 84 and the remote end of the casing 92 is secured over a small diameter sleeve 100 through which the corresponding end of the core 94 extends by means of a suitable clamp 102.

The end of the core 94 extending through the sleeve 100 includes a terminal end portion defining a handle 104 including portions 106 and 108 extending transversely of the longitudinal axis of the sleeve 100 at points spaced longitudinally of the axis. Accordingly, it may be seen that the handle portion 104 may be pulled to retract the locking pin 84 from the bore 86 or that the handle portion 104 may be pushed inwardly to extend the locking pin 84 through the bore 86.

A retaining arm 110 has one end portion 112 pivotally supported from the load bed 14 as at 114, and a second end portion 116 which may be swung into position between the transverse member 108 and the sleeve 100 to prevent inward movement of the handle 104 and thus protraction of the locking pin 84 or into position between the transverse members or portions 106 and 108 thereby preventing the handle portion 104 from being pulled outwardly to the position thereof illustrated in FIGURE 3 of the drawings and thus retraction of the locking pin 84. Further, the shaft 36 includes an abutment 120 thereon and the latter and the stop flange 88 limit shifting of the lever arm 66 longitudinally of the shaft 36.

In operation, if it may be first assumed that the load bed 14 is in a dumping position with the tailgate 20 in an open position, lowering of the forward end of the load bed 14 will result in the tailgate 20 swinging toward a closed position by gravity and the roller 70 contacting the rear end portion 60 of the upper surface 58 whereupon the lower end of the lever 66 will be swung forwardly. If the locking pin 84 is extended through the bore 86, the lever 66 is then keyed to the shaft 36 and the latter will rotate in a clockwise direction from the position thereof illustrated in FIGURE 6 of the drawings to the position thereof illustrated in FIGURE 3 of the drawings swinging the operating lever 40 to the position thereof illustrated in FIGURES 1 and 2 of the drawings and causing the levers 28 to cam the tailgate 20 into its fully closed position. Then, should the load bed 14 be subsequently raised, the back-turned portion 64 will cause the free end of the lever arm 66 to swing downwardly relative to the shaft 36 and thereby rotate the latter in a counterclockwise direction sufficient to shift the pivot connection 44 past its center position relative to the shaft 36 and therefore a load within the load bed 14, upon the latter being pivoted to its dumping position, will be operative to force the tailgate 20 open thus further camming the levers 28 in a counterclockwise direction as viewed in FIGURE 1 of the drawings so that the weight of the offset handle portion 42 of the operating lever 40 will be sufficient to cause the operating lever 40 to swing to the position thereof illustrated in phantom lines in FIGURE 6 of the drawings.

However, if the arm 110 has been previously lifted and the handle portion 104 had been pulled outwardly to the position thereof illustrated in FIGURES 2 and 3 of the drawings before allowing the arm 110 to swing back to the positions thereof illustrated in FIGURES 2 and 3 so as to retain the locking pin 84 in a position retracted out of the bore 86, the downward swinging movement of the free end of the lever 66 caused by the forward end of the load bed 14 being raised would not be operative to pivot the operating shaft 36 in a counterclockwise direction and therefore the tailgate 20 would have remained locked by means of the levers 28, the operating rods 32, and the over-center positioning of the pivot connections 44.

Further, once the load bed 14 has been raised and the tailgate 20 has been automatically unlocked by means of the lever 66 being keyed to the shaft 36 through the locking pin 84, the locking pin may then be retracted out of the bore 86 to the position thereof illustrated in FIGURE 4 of the drawings by pulling out on the handle portion 104 after which the end portion 116 of the arm 110 may be positioned behind the transverse portion 108. Then, subsequent movement of the load bed 14 to the horizontal position illustrated in FIGURE 4 of the drawings will cause the lever arm 66 to be pivoted from the position thereof illustrated in FIGURE 6 of the drawings to the position thereof illustrated in FIGURES 2 and 3 of the drawings, but since the lever arm 66 is not keyed to the shaft 36, the tailgate 20 will not be automatically locked in response to movement of the load bed 14 to the horizontal position. If it then is desired to lock the tailgate 20 in the closed position, the handle portion 42 of the operating lever 40 may be manually grasped and swung from the dotted line position thereof illustrated in FIGURE 6 of the drawings to the solid line position thereof illustrated in FIGURES 1 and 2 of the drawings.

What is claimed as new is as follows:

1. In combination, a vehicle frame, a dump-type load bed supported on said frame for movement between a horizontal disposed position and a dumping position with one end of said load bed elevated above the other end of said load bed, said other end including an open portion and having a closure gate movably supported therefrom for movement between first and second positions in and out of position closing said open portion, respectively, lock means including first and second co-acting portions on said load bed and closure gate respectively, releasably locking said closure gate in said first position thereof, said first portion of said lock means on said load bed being shiftable between active and inactive positions and including a manually actuable portion thereof for manual shifting of said first portion, deactivatable automatic actuator means operatively connected between said load bed and said frame operable to automatically shift said first portion of said lock means to said active position thereof in response to movement of said load bed to said horizontally disposed position from said dumping position, control means operatively connected between said load bed and said automatic actuator means operative to selectively deactivate said automatic actuator means, said first portion including a shaft portion supported from said load bed for oscillation about its longitudinal axis between said active and inactive positions, said automatic actuator means including a lever arm etxending transversely of and having one end portion journaled on said shaft but keyed thereto for rotation therewith when said actuator means is active and an abutment adapted to be carried by said frame and engaged by the other end of said lever arm to swing the latter to a position with said shaft in said active position upon movement of said load bed to said horizontally disposed position.

2. The combination of claim 1 including control means operatively connected with said lever arm and adapted for operative association with said shaft portion for selectively locking and unlocking said lever arm to said shaft portion for rotation therewith.

3. In combination, a vehicle frame, a dump-type load bed supported on said frame for movement between a horizontally disposed position and a dumping position with one end of said load bed elevated above the other end of said load bed, said other end including an open portion and having a closure gate movably supported therefrom for movement between first and second positions in and out of position closing said open portion, respectively, lock means including first and second coacting portions on said load bed and closure gate respectively, releasably locking said closure gate in said first position thereof, said first portion of said lock means on said load bed being shiftable between active and inactive positions and including a manually actuatable portion thereof for manual shifting of said first portion, deactivatable automatic actuator means operatively connected between said load bed and said frame operable to automatically shift said first portion of said lock means to said inactive position thereof in response to movement of said load bed from said horizontally disposed position toward said dumping position, control means operatively connected between said load bed and said automaic actuator means operative to selectively deactivate said automatic actuator means, said first portion including a shaft portion supported from said load bed for oscillation about its longitudinal axis between said active and inactive positions, said automatic actuator means including a lever arm extending transversely of and having one end portion journaled on said shaft but keyed thereto for rotation therewith when said actuator means is active and an abutment adapted to be carried by said frame and engaged by the other end of said lever arm to swing the latter from a position with said shaft in said active position and toward a position with said shaft in said inactive position upon movement of said load bed from said horizontally disposed position toward said dumping position.

4. The combination of claim 3 wherein engagement of said other end of said lever arm with said abutment is also adapted to swing said lever arm to a position with said shaft in said active position upon movemnt of said load bed to said horizontally disposed position.

References Cited
UNITED STATES PATENTS

| | | |
|---|---|---|
| 2,261,745 | 11/1941 | Sand. |
| 2,675,268 | 4/1954 | Hutchinson _____ 298—38 X |
| 2,767,017 | 10/1956 | Enriquez. |
| 2,954,995 | 10/1960 | Grise _____ 298—38 X |

RICHARD J. JOHNSON, *Primary Examiner.*